United States Patent
Morikuni

(10) Patent No.: US 11,579,424 B2
(45) Date of Patent: Feb. 14, 2023

(54) PROJECTION SYSTEM AND PROJECTOR

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 80 days.

(21) Appl. No.: 17/155,232

(22) Filed: Jan. 22, 2021

(65) Prior Publication Data

US 2021/0231932 A1 Jul. 29, 2021

(30) Foreign Application Priority Data

Jan. 23, 2020 (JP) .............................. JP2020-008955

(51) Int. Cl.
  *G03B 21/28* (2006.01)
  *G02B 17/08* (2006.01)
  *G02B 13/00* (2006.01)

(52) U.S. Cl.
  CPC ..... *G02B 17/0856* (2013.01); *G02B 13/0095* (2013.01); *G03B 21/28* (2013.01)

(58) Field of Classification Search
  CPC .... G03B 21/006; G03B 21/008; G03B 21/28; G03B 21/145; G03B 21/2053; G03B 21/2066; H04N 9/315; H04N 9/3141; H04N 9/3152; H04N 9/3155; H04N 9/3158; G02B 17/08; G02B 17/086; G02B 17/0856; G02B 17/008; G02B 13/0025; G02B 13/0095; G02B 13/086; G02B 13/16; G02B 13/18; G02B 13/22
  See application file for complete search history.

(56) References Cited

U.S. PATENT DOCUMENTS

| 7,048,388 | B2 | 5/2006 | Takaura et al. |
| 7,549,755 | B2 | 6/2009 | Suzuki |
| 2004/0156117 | A1 | 8/2004 | Takaura et al. |
| 2006/0193036 | A1 | 8/2006 | Suzuki |
| 2008/0024746 | A1* | 1/2008 | Mann .................. G03F 7/70058 355/53 |
| 2008/0068563 | A1* | 3/2008 | Abe .................... G02B 17/0852 348/E9.027 |

(Continued)

FOREIGN PATENT DOCUMENTS

| JP | 2004-246042 A | 9/2004 |
| JP | 2006-235516 A | 9/2006 |

(Continued)

*Primary Examiner* — Sultan Chowdhury
(74) *Attorney, Agent, or Firm* — Oliff PLC

(57) ABSTRACT

A projection system includes a first and second optical system including an optical element. The optical element has a first transmissive surface, a reflection surface, and a second transmissive surface. The second transmissive surface has a convex shape an aspheric shape. An effective light ray range of the second transmissive surface has a first end close to an optical axis of the reflection surface in a first axis direction along a first axis perpendicular to the optical axis and a second end far from the optical axis. A first radius of curvature at the first end is greater than a second radius of curvature at the second end, and a first center of curvature of the first radius of curvature is farther than a second center of curvature of the second radius of curvature from the first end.

13 Claims, 13 Drawing Sheets

(56) References Cited

U.S. PATENT DOCUMENTS

| | | | |
|---|---|---|---|
| 2009/0213470 A1* | 8/2009 | Abe | G02B 27/1026 359/649 |
| 2010/0053737 A1* | 3/2010 | Fujita | G02B 17/0852 359/364 |
| 2019/0011684 A1 | 1/2019 | Ishihara et al. | |
| 2020/0033715 A1 | 1/2020 | Morikuni | |

FOREIGN PATENT DOCUMENTS

| | | | |
|---|---|---|---|
| JP | 2007-316674 A | | 12/2007 |
| JP | 2010-020344 A | | 1/2010 |
| JP | 2017-156712 A | | 9/2017 |
| JP | 2017-156713 A | | 9/2017 |
| JP | 2017-156714 A | | 9/2017 |
| JP | 2020042103 A | * | 9/2018 |
| JP | 2019-133061 A | | 8/2019 |
| JP | 2020-024377 A | | 2/2020 |
| JP | 2020-042103 A | | 3/2020 |
| JP | 2020-194115 A | | 12/2020 |

* cited by examiner ized projection system according to Example 1.

PROJECTION SYSTEM AND PROJECTOR

The present application is based on, and claims priority from JP Application Serial Number 2020-008955, filed Jan. 23, 2020, the disclosure of which is hereby incorporated by reference herein in its entirety.

BACKGROUND

1. Technical Field

The present disclosure relates to a projection system and a projector.

2. Related Art

JP-A-2010-20344 describes a projector that enlarges and projects a projection image formed by an image formation section via a projection system. The projection system described in JP-A-2010-20344 is formed of a first optical system and a second optical system sequentially arranged from the reduction side toward the enlargement side. The first optical system is a refractive optical system including a plurality of lenses. The second optical system is formed of a reflection mirror having a concave reflection surface. The image formation section includes a light source and a light valve. The image formation section forms a projection image in the reduction-side image formation plane of the projection system. The projection system forms an intermediate image in a position between the first optical system and the reflection surface and projects a final image on a screen disposed in the enlargement-side image formation plane of the projection system.

The projection system and the projector are required to have a short projection distance.

SUMMARY

To solve the problem described above, a projection system according to an aspect of the present disclosure includes a first optical system and a second optical system including an optical element and disposed on an enlargement side of the first optical system. The optical element has a first transmissive surface, a reflection surface disposed at the enlargement side of the first transmissive surface, and a second transmissive surface disposed at the enlargement side of the reflection surface. The second transmissive surface has a convex shape protruding toward the enlargement side and has an aspheric shape. An effective light ray range of the second transmissive surface has a first end close to an optical axis of the reflection surface in a first axis direction along a first axis perpendicular to the optical axis and a second end far from the optical axis in the first axis direction. A first radius of curvature at the first end is greater than a second radius of curvature at the second end, and a first center of curvature of the first end is farther than a second center of curvature of the second end from the first end.

A projector according to another aspect of the present disclosure includes the projection system described above and an image formation section that forms a projection image in a reduction-side image formation plane of the projection system.

DESCRIPTION OF EXEMPLARY EMBODIMENTS

A projection system according to an embodiment of the present disclosure and a projector including the projection system will be described below in detail with reference to the drawings.

Projector

Figure 1:
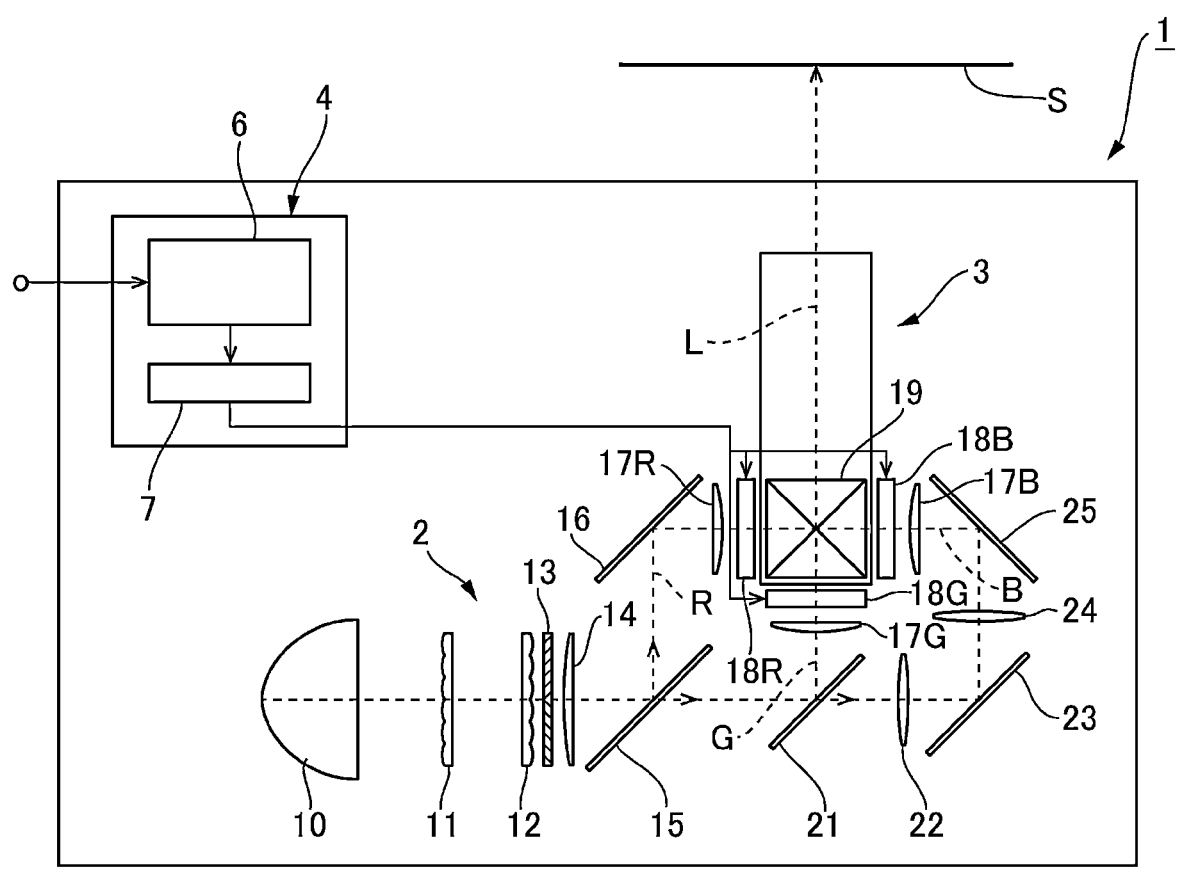
FIG. 1 is a schematic configuration diagram of a projector including a projection system.

FIG. 1 is a schematic configuration diagram of a projector including a projection system 3 according to the present disclosure. A projector 1 includes an image formation section 2, which generates a projection image to be projected on a screen S, the projection system 3, which enlarges the projection image and projects the enlarged image on the screen S, and a controller 4, which controls the action of the image formation section 2, as shown in FIG. 1.

Image Generation Optical System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display area of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits the B light, which is part of the light rays via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The cross dichroic prism 19 forms part of the projection system 3. The projection system 3 enlarges and projects the projection images (images formed by liquid crystal panels 18R, 18G, and 18B) combined by the cross dichroic prism 19 on the screen S. The screen S is the enlargement-side image formation plane of the projection system 3.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus causes the liquid crystal panels 18R, 18G, and 18B to display projection images corresponding to the image signals.

Projection System

As the projection system 3 incorporated in the projector 1, a projection system 3A according to Example 1 and a projection system 3B according to Example 2 will be described below. In the following description and figures, the liquid crystal panels 18R, 18G, and 18B are referred to as liquid crystal panels 18.

Example 1

Figure 2:
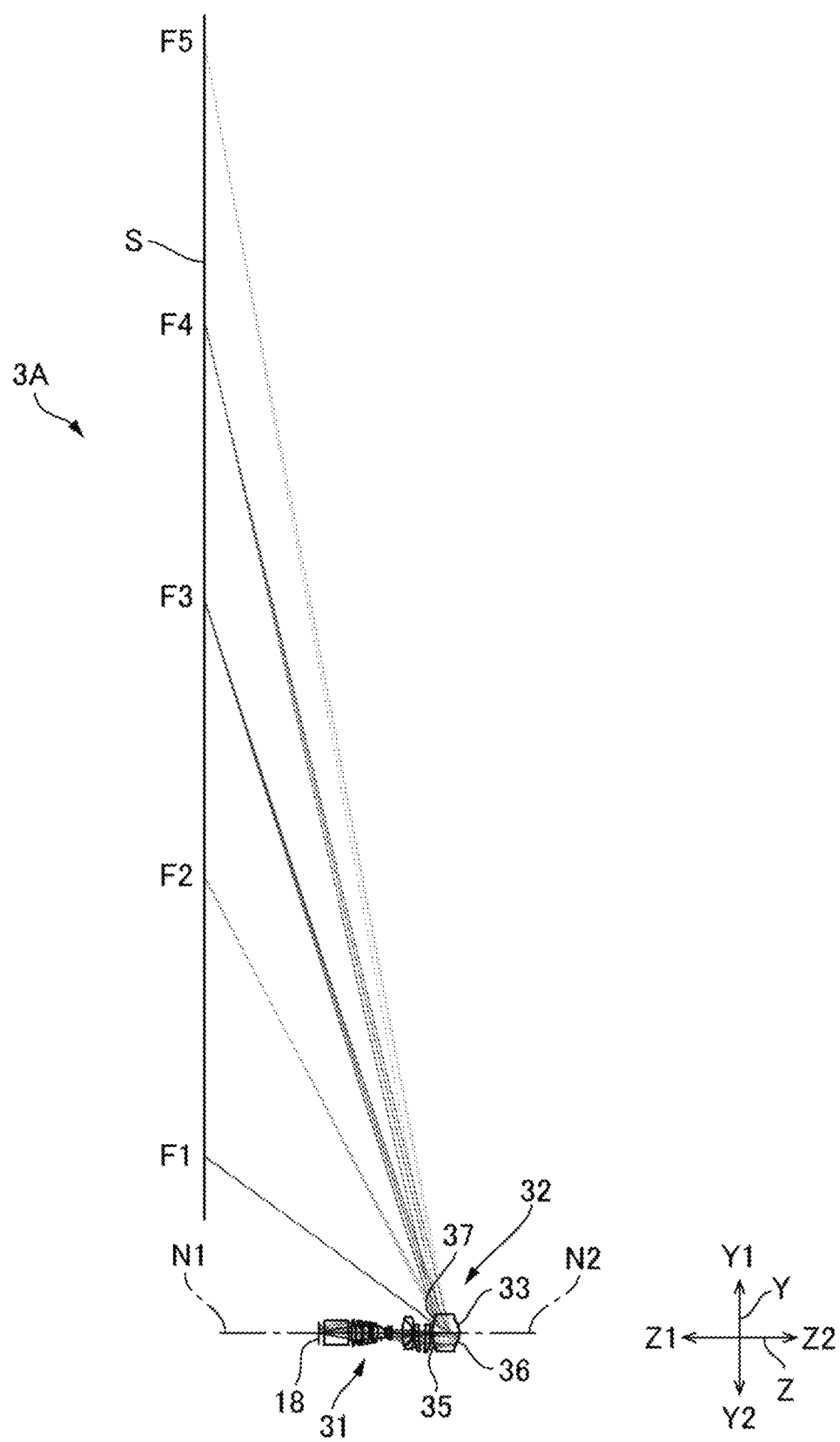
FIG. 2 is a light ray diagram diagrammatically showing the entire projection system according to Example 1.
Figure 3:
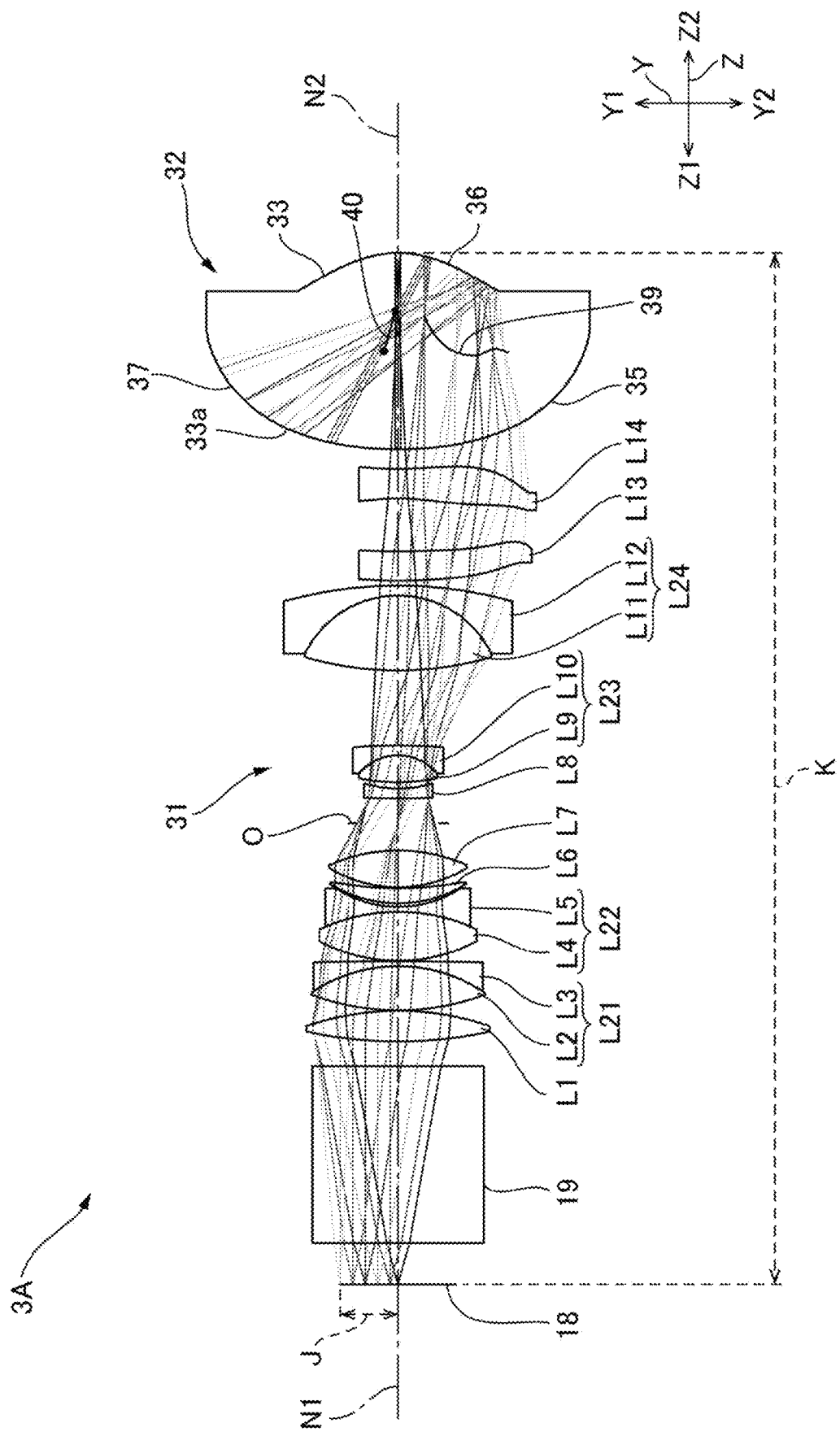
FIG. 3 is a light ray diagram of the projection system according to Example 1.
Figure 4:
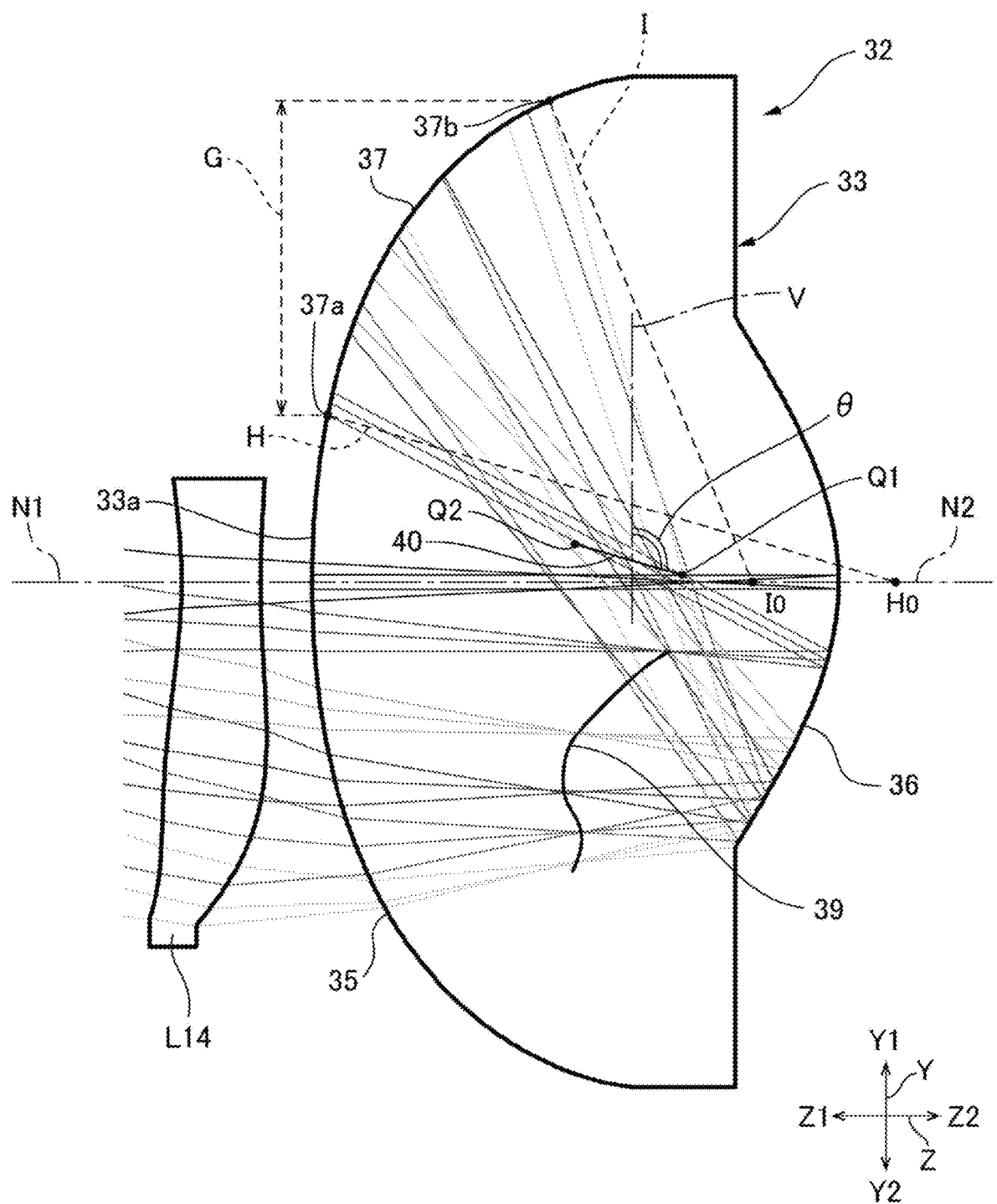
FIG. 4 is a light ray diagram of a second optical system of the projection system according to Example 1.

FIG. 2 is a light ray diagram diagrammatically showing the entire projection system 3A according to Example 1. FIG. 3 is a light ray diagram of the projection system 3A according to Example 1. FIG. 4 is a light ray diagram of a second optical system of the projection system 3A according to Example 1. FIG. 2 diagrammatically shows light fluxes F1 to F5, which exit out of the projection system 3A according to the present example and reach the screen S. The light flux F1 is a light flux that reaches a smallest image height position. The light flux F5 is a light flux that reaches a largest image height position. The light flux F3 is a light flux that reaches a position between the position that the light flux F1 reaches and the position that the light flux F5 reaches. The light flux F2 is a light flux that reaches a position between the position that the light flux F1 reaches and the position that the light flux F3 reaches. The light flux F4 is a light flux that reaches a position between the position that the light flux F3 reaches and the position that the light flux F5 reaches.

The projection system 3A according to the present example is formed of a first optical system 31 and a second optical system 32 sequentially arranged from the reduction side toward the enlargement side, as shown in FIG. 3. The first optical system 31 is a refractive optical system including a plurality of lenses. The second optical system 32 is formed of one optical element 33. The optical element 33 has a first transmissive surface 35, a reflection surface 36, and a second transmissive surface 37 sequentially arranged from the reduction side toward the enlargement side. The first transmissive surface 35 has a convex shape protruding toward the reduction side. The reflection surface 36 has a concave shape. The second transmissive surface 37 has a convex shape protruding toward the enlargement side. The optical element 33, which forms the second optical system 32, is disposed in a first optical axis N1 of the first optical system 31. In the second optical system 32, a second optical axis N2 (optical axis) of the reflection surface 36 coincides with the first optical axis N1.

The liquid crystal panels 18 of the image formation section 2 are disposed in the reduction-side image formation plane of the projection system 3A. The liquid crystal panels 18 form the projection images at one side of the first optical axis N1 of the first optical system 31. The screen S is disposed in the enlargement-side image formation plane of the projection system 3A, as shown in FIGS. 2, 3, and 4. A final image is projected on the screen S. The screen S is located at the same side of the first optical axis N1 as the side where the liquid crystal panels 18 form the projection images. An intermediate image 39 conjugate with the reduction-side image formation plane and the enlargement-side image formation plane is formed between the first optical system 31 and the reflection surface 36 of the optical element 33. The intermediate image 39 is an image conjugate with the final image but turned upside down. In the present example, the intermediate image 39 is formed inside the optical element 33. More specifically, the intermediate image 39 is formed between the first transmissive surface 35 and the reflection surface 36 of the optical element 33.

In the following description, three axes perpendicular to one another are called axes X, Y (first axis), and Z for convenience. The width direction of the screen S, which is the enlargement-side image formation plane, is called an axis-X direction, the upward/downward direction of the screen S is called an axis-Y direction, and the direction perpendicular to the screen S is called an axis-Z direction.

The axis-Z direction toward the side where the screen S is located is called a first direction Z1, and the axis-Z direction opposite the first direction Z1 is called a second direction Z2. The plane containing the first optical axis N1 of the first optical system 31 and the second optical axis N2 of the reflection surfaces 36 of the optical element 33 and extending in the axis-Y direction is called a plane YZ. FIGS. 2, 3, and 4 are each a light ray diagram in the plane YZ. The first optical axis N1 and the second optical axis N2 extend in the axis-Z direction. The liquid crystal panels 18 form the projection images at an upper side Y1 of the first optical axis N1 of the first optical system 31. The screen S is disposed at the upper side Y1 of the first optical axis N1 of the first optical system 31. The intermediate image 39 is formed at a lower side Y2 of the first optical axis N1.

The first optical system 31 includes the cross dichroic prism 19 and 14 lenses L1 to L14, as shown in FIG. 3. The lenses L1 to L14 are arranged in the presented order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. The lenses L11 and L12 are bonded to each other into a fourth doublet L24. An aperture O is disposed between the lens L7 and the lens L8.

In the first optical system 31, the lens L13 has positive power. The first optical system 31 as a whole has positive power. Between the first optical system 31 and the second optical system 32, the gap between the chief rays therein therefore decreases with distance to the second optical system 32.

The optical element 33 is designed by using the second optical axis N2 of the reflection surface 36 as the axis in the design stage. In other words, the second optical axis N2 is the design-stage optical axis of the first transmissive surface 35, the second transmissive surface 37, and the reflection surface 36. The first transmissive surface 35 and the reflection surface 36 are located at the lower side Y2 of the second optical axis N2, and the second transmissive surface 37 is located at the upper side Y1 of the second optical axis N2, as shown in FIGS. 3 and 4. That is, the optical element 33 has a first surface 33a facing the first optical system 31. The first transmissive surface 35 is a portion of the first surface 33a that is the portion provided at the lower side Y2 of the second optical axis N2, and the second transmissive surface 37 is a portion of the first surface 33a that is the portion provided at the upper side Y1 of the second optical axis N2. The first transmissive surface 35 and the second transmissive surface 37 are contiguous to each other. The first transmissive surface 35 and the second transmissive surface 37 are rotationally symmetric when rotated by 180° around the second optical axis N2.

In the present example, the first transmissive surface 35, the reflection surface 36, and the second transmissive surface 37 of the optical element 33 each have a rotationally symmetric shape around the second optical axis N2. The first transmissive surface 35, the reflection surface 36, and the second transmissive surface 37 are each provided within an angular range of 180° around the second optical axis N2.

The first transmissive surface 35, the reflection surface 36, and the second transmissive surface 37 of the optical element 33 are each an aspheric surface. The reflection surface 36 is a reflection coating layer provided on a surface of the optical element 33 that is the surface opposite the first transmissive surface 35. The first transmissive surface 35, the reflection surface 36, and the second transmissive surface 37 can instead each be a free-form surface. In this case, the free-form surfaces are designed by using the second optical axis N2 as the design-stage axis. Therefore, also when any of the first transmissive surface 35, the reflection surface 36, and the second transmissive surface 37 is a free-form surface in the projection system 3A, the second optical axis N2 of the reflection surface 36 is called the optical axis of the optical element 33.

A pupil 40 of the second optical system 32 is located inside the optical element 33, as shown in FIG. 4. The pupil 40 of the second optical system 32 in the plane YZ is defined by the line that connects an upper intersection Q1, where an upper peripheral light ray of an upper end light flux passing through the axis-Y-direction upper end of an effective light ray range G of the second transmissive surface 37 and an upper peripheral light ray of a lower end light flux passing through the axis-Y-direction lower end of the effective light ray range G intersect each other in the plane YZ, to a lower intersection Q2, where a lower peripheral light ray of the upper end light flux and a lower peripheral light ray of the lower end light flux intersect each other in the plane YZ.

The pupil 40 inclines with respect to an imaginary vertical line V perpendicular to the second optical axis N2 in the plane YZ. In the present example, an inclination angle θ by which the pupil 40 inclines with respect to the imaginary vertical line V is greater than or equal to 90°. The inclination angle θ is the angle measured clockwise from the imaginary vertical line V in the plane of view of FIG. 4.

Lens Data

The numerical aperture of the projection system 3A is 0.264. Data on the lenses of the projection system 3A are listed below. The surfaces of the lenses are numbered sequentially from the enlargement side toward the reduction side. An aspheric surface has a surface number preceded by *. Reference characters are given to the lenses and the mirror. Data labeled with a surface number that does not correspond to any of the lenses or the mirror is dummy data. Reference character r denotes the radius of curvature. Reference character d denotes the axial inter-surface distance. Reference character nd denotes the refractive index. Reference character vd denotes the Abbe number. Reference character Y denotes the effective radius. Reference characters r, d, and Y are each expressed in millimeters. The projection distance of the projection system 3A is the distance from the surface having the surface number 30 to the screen S.

| Surface number | Name | r | d | nd | vd | Mode | Y |
|---|---|---|---|---|---|---|---|
| Object plane | 18 | 0 | 8.5 | | | Refraction | |
| 1 | 19 | 0 | 35.95 | 1.51633 | 64.14 | Refraction | 12.884 |
| 2 | | 0 | 5 | | | Refraction | 16.164 |
| 3 | L01 | 87.70723 | 6.286115 | 1.804198 | 46.5 | Refraction | 17 |
| 4 | | −57.08763 | 0.1 | | | Refraction | 17.289 |

-continued

| Surface number | Name | r | d | nd | vd | Mode | Y |
|---|---|---|---|---|---|---|---|
| 5 | L02 | 50.11481 | 8.933336 | 1.70122 | 51.06 | Refraction | 16.372 |
| 6 | L03 | −31.33958 | 1 | 2.0297 | 22.486 | Refraction | 15.935 |
| 7 | | −743.77014 | 0.1 | | | Refraction | 15.489 |
| 8 | L04 | 33.3983 | 10 | 1.609833 | 57.68 | Refraction | 14.749 |
| 9 | L05 | −36.95306 | 1 | 2.0508 | 26.942 | Refraction | 13.522 |
| 10 | | 22.94065 | 0.712798 | | | Refraction | 12.535 |
| 11 | L06 | 26.07013 | 3.050884 | 1.907998 | 17.47 | Refraction | 12.692 |
| 12 | | 68.49901 | 0.2 | | | Refraction | 12.646 |
| 13 | L07 | 26.30055 | 7.536026 | 1.531802 | 37.64 | Refraction | 12.827 |
| 14 | | −33.7375 | 5.5 | | | Refraction | 12.577 |
| Aperture plane | O | 0 | 5.1014 | | | Refraction | 8.335 |
| 16 | L08 | 139.13247 | 2 | 2.0508 | 26.942 | Refraction | 6.044 |
| 17 | | 22.61295 | 1.279802 | | | Refraction | 6.296 |
| 18 | L09 | 38.82127 | 5.472202 | 1.827946 | 18.85 | Refraction | 6.836 |
| 19 | L10 | −10.25786 | 2 | 2.0508 | 26.942 | Refraction | 7.171 |
| 20 | | −103.80704 | 15.256816 | | | Refraction | 8.308 |
| 21 | L11 | 67.45796 | 15.249276 | 1.721004 | 21.74 | Refraction | 18 |
| 22 | L12 | −21 | 2 | 1.986125 | 16.48 | Refraction | 18.365 |
| 23 | | −85.63363 | 1 | | | Refraction | 21.704 |
| *24 | L13 | 89.39521 | 6 | 1.531131 | 55.75 | Refraction | 24.789 |
| *25 | | 135.83386 | 10.821826 | | | Refraction | 25.484 |
| *26 | L14 | −40.60878 | 6 | 1.531131 | 55.75 | Refraction | 25.821 |
| *27 | | 75.15821 | 3.949519 | | | Refraction | 26.404 |
| *28 | 35 | 75 | 40 | 1.509398 | 56.47 | Refraction | 25.031 |
| *29 | 36 | −20.69003 | −40 | 1.509398 | 56.47 | Reflection | 20.434 |
| *30 | 37 | 75 | −340 | | | Refraction | 36.918 |
| Image plane | S | 0 | 0 | | | Refraction | 1896.639 |

The aspheric constants of each of the aspheric surfaces are listed below.

| Surface number | 24 |
|---|---|
| Conic constant | 5.77429E+00 |
| Fourth-order coefficient | −1.277984E−05 |
| Sixth-order coefficient | 4.854237E−08 |
| Eighth-order coefficient | −4.719966E−11 |

| Surface number | 25 |
|---|---|
| Conic constant | 1.554549E+01 |
| Fourth-order coefficient | −1.429342E−05 |
| Sixth-order coefficient | 5.874813E−08 |
| Eighth-order coefficient | −6.402841E−11 |

| Surface number | 26 |
|---|---|
| Conic constant | −1.853268E+01 |
| Fourth-order coefficient | 1.768906E−05 |
| Sixth-order coefficient | −2.148942E−08 |
| Eighth-order coefficient | 1.683947E−12 |

| Surface number | 27 |
|---|---|
| Conic constant | 6.360499E+00 |
| Fourth-order coefficient | −2.834254E−05 |
| Sixth-order coefficient | 1.085867E−08 |
| Eighth-order coefficient | −7.956799E−12 |

| Surface number | 28 |
|---|---|
| Conic constant | 2.73436E+00 |
| Fourth-order coefficient | 1.999342E−06 |
| Sixth-order coefficient | 5.655581E−10 |
| Eighth-order coefficient | −1.110814E−12 |
| Tenth-order coefficient | 5.978994E−16 |

| Surface number | 29 |
|---|---|
| Conic constant | −3.946039E+00 |
| Fourth-order coefficient | −2.068501E−05 |
| Sixth-order coefficient | 6.298578E−08 |
| Eighth-order coefficient | −1.022231E−10 |
| Tenth-order coefficient | 8.568319E−14 |

| Surface number | 30 |
|---|---|
| Conic constant | 2.73436E+00 |
| Fourth-order coefficient | 1.999342E−06 |
| Sixth-order coefficient | 5.655581E−10 |
| Eighth-order coefficient | −1.110814E−12 |
| Tenth-order coefficient | 5.978994E−16 |

Figure 5:
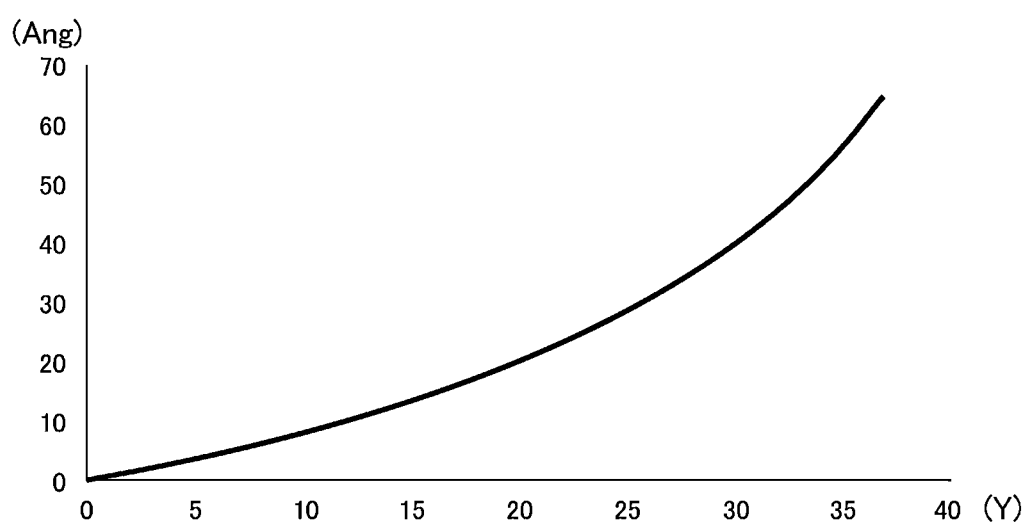
FIG. 5 is a graph showing the relationship between the height position on a second transmissive surface and the inclination angle of the tangent at the height position.

The surface having the surface number 30, that is, the second transmissive surface 37 has curvature in the second direction Z2 that increases as the distance from the second optical axis N2 toward the upper side Y1 increases. In detail, an end of the effective light ray range G of the second transmissive surface 37 in the plane YZ that is the end closest to the second optical axis N2 in the axis-Y direction is called a first end 37a, and an end of the effective light ray range G of the second transmissive surface 37 in the plane YZ that is the end farthest from the second optical axis N2 in the axis-Y direction is called a second end 37b, as shown in FIG. 4. In this case, a first radius of curvature H at the first end 37a is greater than a second radius of curvature I at the second end 37b. A first center of curvature HO of the first end 37a and a second center of curvature IO of the second end 37b are located on the second optical axis N2, and the first center of curvature HO is farther than the second center of curvature IO from the first end 37a. That is, the first center of curvature HO of the first radius of curvature H is shifted in the second direction Z2 from the second center of curvature IO of the second radius of curvature I. FIG. 5 is a graph showing the relationship between a height position Y in the light ray effective diameter and an inclination angle Ang of the tangent at the height position Y. In FIG. 5, the horizontal axis represents the height position Y, and the vertical axis represents the angle Ang. The height position Y along the second optical axis N2 is zero. The height position Y is expressed in millimeters.

When the second transmissive surface 37 is formed of a free-form surface, the first radius of curvature H is determined based on an osculating circle formed of an arcuate that is an approximation of the first end 37a of the second transmissive surface 37. The second radius of curvature I is determined based on an osculating circle formed of an arcuate that is an approximation of the second end 37b of the second transmissive surface 37. Also in these cases, the first center of curvature HO of the first radius of curvature H and the second center of curvature IO of the second radius of curvature I are located on the second optical axis N2. The first center of curvature HO of the first radius of curvature H is shifted in the second direction from the second center of curvature IO of the second radius of curvature I.

In the projection system 3A, the quotient of the operation of dividing an axial inter-surface distance K from the liquid crystal panels 18, which are located in the reduction-side image formation plane, to the reflection surface 36 by a radius J of the image circle in the reduction-side image formation plane is smaller than 20, as shown in FIG. 3. That is, the axial inter-surface distance K is 210 mm, and the radius J is 11.7 mm. The quotient of the operation of dividing the axial inter-surface distance K by the radius J is 17.94, which is smaller than 20. The axial inter-surface distance K is the overall length of the projection system 3A.

Effects and Advantages

The projection system 3A according to the present example includes the first optical system 31 and the second optical system 32 sequentially arranged from the reduction side toward the enlargement side. The second optical system 32 includes the optical element 33, which has the first transmissive surface 35, the reflection surface 36, and the second transmissive surface 37 sequentially arranged from the reduction side toward the enlargement side. The second transmissive surface 37 has a convex shape protruding toward the enlargement side and has an aspheric shape.

Therefore, in the projection system 3A according to the present example, the second transmissive surface 37 can refract the light flux reflected off the reflection surface 36 in the second optical system 32. The projection distance of the projection system 3A can therefore be shortened as compared with a case where the second optical system 32 has only the reflection surface 36. In other words, the projection system 3A according to the present example can have a short focal length as compared with the case where the second optical system 32 has only the reflection surface 36.

In the effective light ray range G of the second transmissive surface 37 of the second optical system 32, the first radius of curvature H of the first end 37a closer to the second optical axis N2 is greater than the second radius of curvature I of the second end 37b farther from the second optical axis N2. The first center of curvature HO of the first end 37a and the second center of curvature IO of the second end 37b are located on the second optical axis N2, and the first center of curvature HO of the first end 37a is farther than the second center of curvature IO of the second end 37b from the first end 37a. In other words, the second transmissive surface 37 is so shaped that the inclination of the tangent at each height position Y separate from the second optical axis N2 toward the upper side Y1 increases with distance from the second optical axis N2, and the rate of the increase in the inclination of the tangent increases with distance from the second optical axis N2 toward the upper side Y1. The convex shape of the second transmissive surface 37 that protrudes toward the upward side Y1 therefore has curvature in the second direction Z2 that increases as the distance from the second optical axis N2 toward the upper side Y1 increases. The light ray passing through the second end 37b of the effective light ray range G therefore readily reaches an upper portion of the screen S. The projection angle of the projection system 3A thus increases, whereby the projection distance can be further shortened.

The convex shape of the second transmissive surface 37 has curvature in the second direction Z2 that increases as the distance from the second optical axis N2 toward the upper side Y1 increases. Therefore, at the second transmissive surface 37, the light flux passing through the first end 37a separate from the second optical axis N2 can be refracted at an angle greater than the angle at which the light flux is refracted at the second end 37b close to the second optical axis N2. The thus functioning second transmissive surface 37 can suppress inclination of the intermediate image 39, which is conjugate with the screen S, with respect to the second optical axis N2 of the reflection surface 36 and the resultant increase in the size of the intermediate image 39. An increase in the size of the reflection surface 36, which is located at the enlargement side of the intermediate image 39, can therefore be suppressed even when the projection distance is shortened. The size of the projection system 3A can therefore be reduced in the axis-Z direction.

In the present example, the intermediate image 39 is located between the first transmissive surface 35 and the reflection surface 36 of the optical element 33. The first optical system 31 and the optical element 33 are therefore allowed to approach each other as compared with a case where the intermediate image 39 is formed between the first optical system 31 and the optical element 33. The size of the projection system 3A can thus be reduced in the axis-Z direction.

The optical element 33 has the first surface 33a, which faces the first optical system 31. The first transmissive surface 35 is a portion of the first surface 33a that is the portion provided at the lower side Y2 of the second optical axis N2, and the second transmissive surface 37 is a portion of the first surface 33a that is the portion provided at the upper side Y1 of the second optical axis N2. The first transmissive surface 35 and the second transmissive surface 37 are contiguous to each other. The one optical element 33 therefore is readily formed of the first transmissive surface 35 and the second transmissive surface 37.

The first transmissive surface 35 and the second transmissive surface 37 are so formed as to form the first surface 33a of the optical element 33 and are rotationally symmetric when rotated by 180° around the second optical axis N2. Further, in the optical element 33, the first transmissive surface 35, the reflection surface 36, and the second transmissive surface 37 each have a rotationally symmetric shape around the second optical axis N2. The optical element 33 is therefore readily manufactured as compared with a case where the surfaces are not rotationally symmetric.

The pupil 40 of the second optical system 32 inclines with respect to the imaginary vertical line V perpendicular to the second optical axis N2. Therefore, in the projection system 3A, a decrease in the amount of light at a periphery of the screen S that is the periphery at the upper side Y1 can therefore be suppressed as compared with a case where the pupil 40 is parallel to the imaginary vertical line V. That is, in the configuration in which the pupil 40 inclines with respect to the imaginary vertical line V perpendicular to the second optical axis N2, the amount of light flux F1, which reaches the upper portion of the screen S, increases as compared with the case where the pupil 40 is parallel to the imaginary vertical line V. Further, when the amount of light flux F1, which reaches the upper portion of the screen S, increases, the difference in the amount of light between the light flux F1 and the light flux F3, which reaches the lower portion of the screen S decreases. A decrease in the amount of light at the upper periphery of the screen S as compared with that at the lower periphery of the screen S can therefore be suppressed.

In the present example, between the first optical system 31 and the second optical system 32, the gap between the chief rays therein decreases with distance to the second optical system 32. Therefore, the intermediate image 39 can be readily formed, and the size of the intermediate image 39 can be reduced. The size of the reflection surface 36, which is located at the enlargement side of the intermediate image 39, is readily reduced.

In the projection system 3A in the present example, the quotient of the operation of dividing the axial inter-surface distance K from the liquid crystal panels 18, which are located in the reduction-side image formation plane, to the reflection surface 36 by the radius J of the image circle in the reduction-side image formation plane is smaller than 20. The overall length of the projection system 3A is therefore shortened.

In the present example, the numerical aperture is greater than 0.25, whereby the projection system 3A is a bright optical system.

Further, in the optical element 33 in the present example, the first transmissive surface 35, which is located at the reduction side of the intermediate image 39, is an aspheric surface, whereby occurrence of aberrations at the intermediate image 39 can be suppressed. Moreover, the reflection surface 36 and the second transmissive surface 37 of the optical element 33 are also each an aspheric surface. Occurrence of aberrations can therefore be suppressed in the enlargement-side image formation plane.

Figure 6:
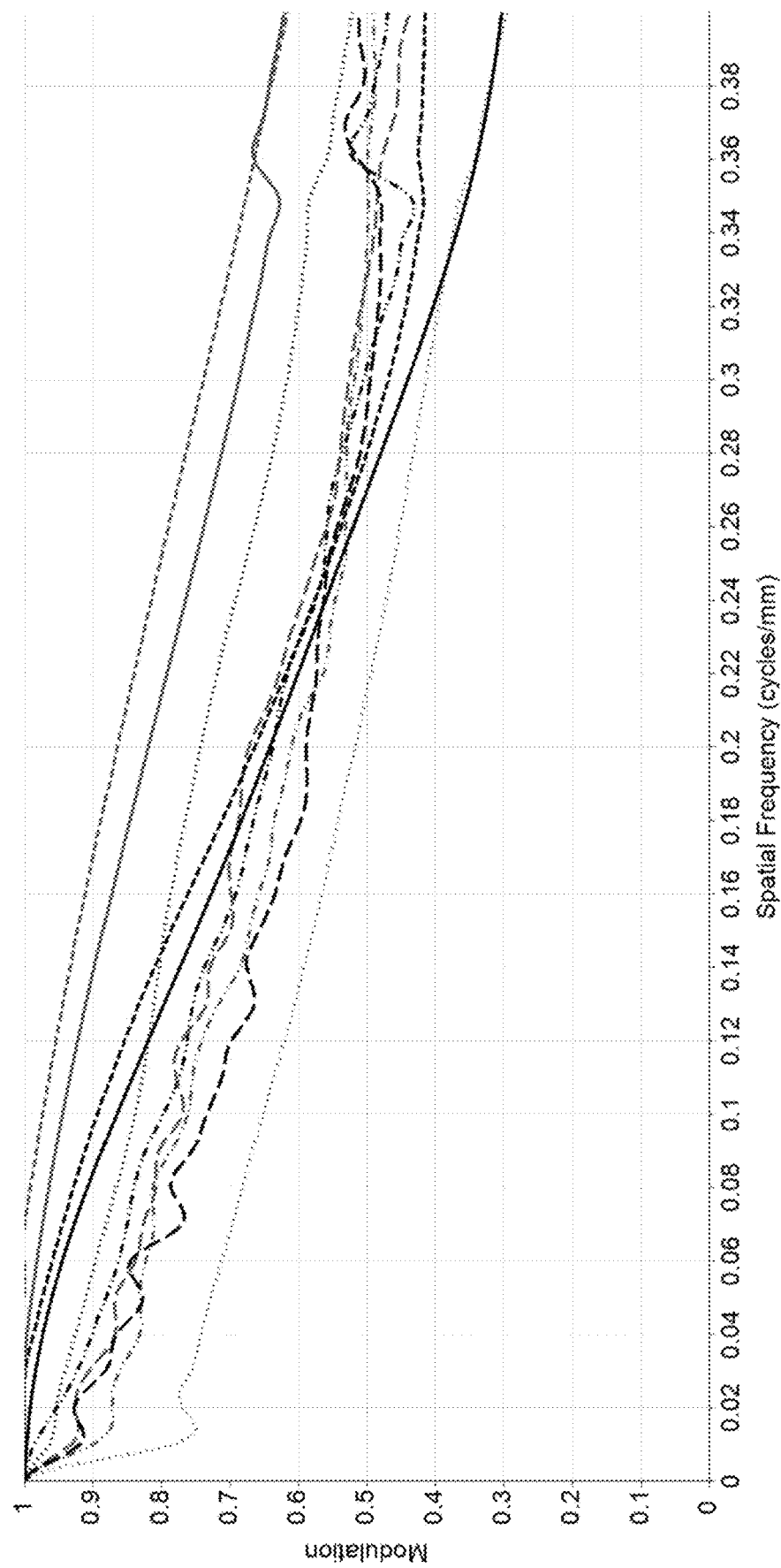
FIG. 6 shows the enlargement-side MTF of the projection system according to Example 1.
Figure 7:
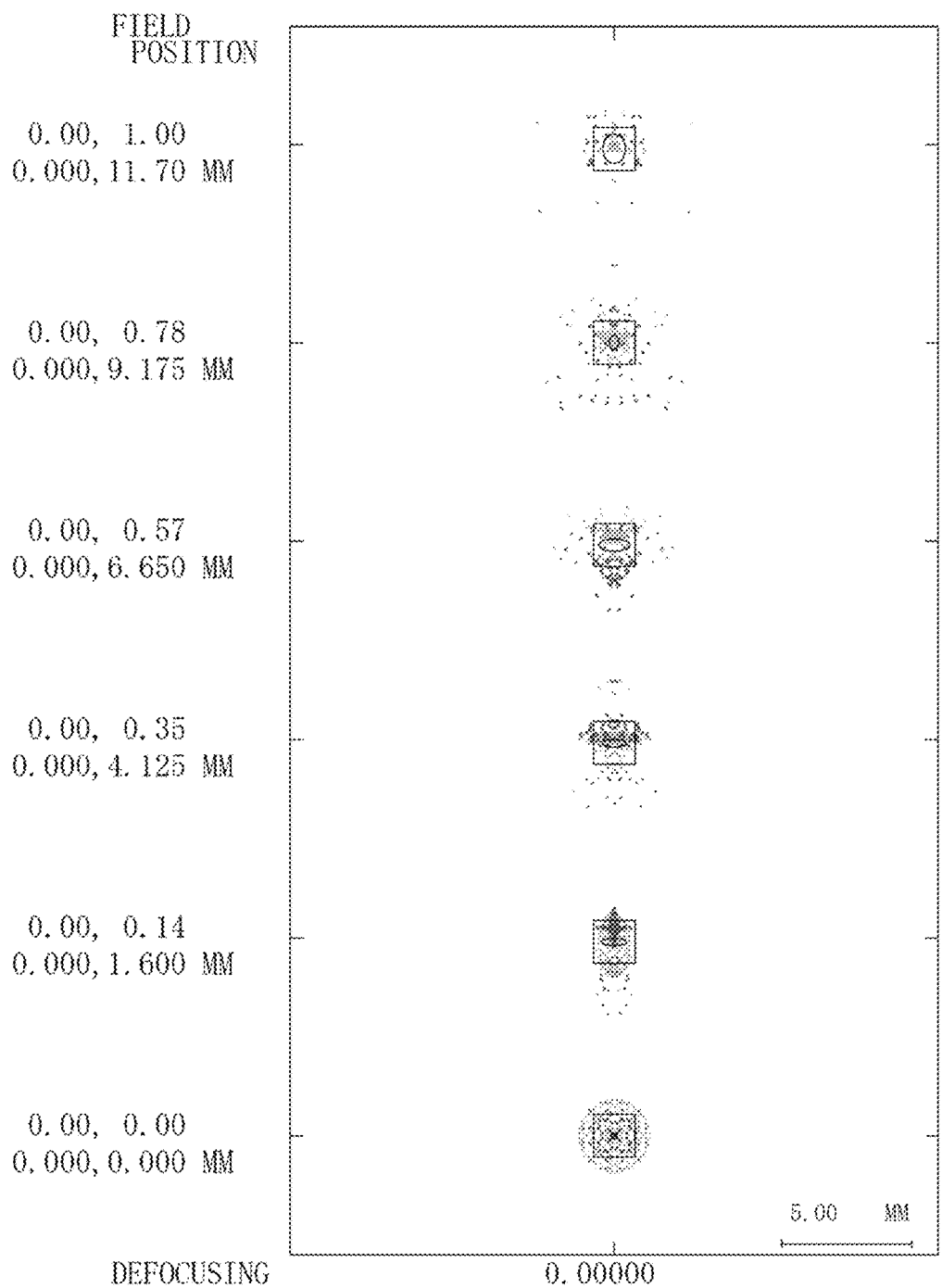
FIG. 7 is a spot diagram showing how the light is collected on an image height position basis.

FIG. 6 shows the enlargement-side MTF of the projection system 3A. The horizontal axis of FIG. 6, which shows the MTF, represents the spatial frequency. The vertical axis of FIG. 6 represents a contrast reproduction ratio. FIG. 7 is a spot diagram showing how the light is collected on an image height position basis. The projection system 3A according to the present example provides high resolution, as shown in FIGS. 6 and 7.

Example 2

Figure 8:
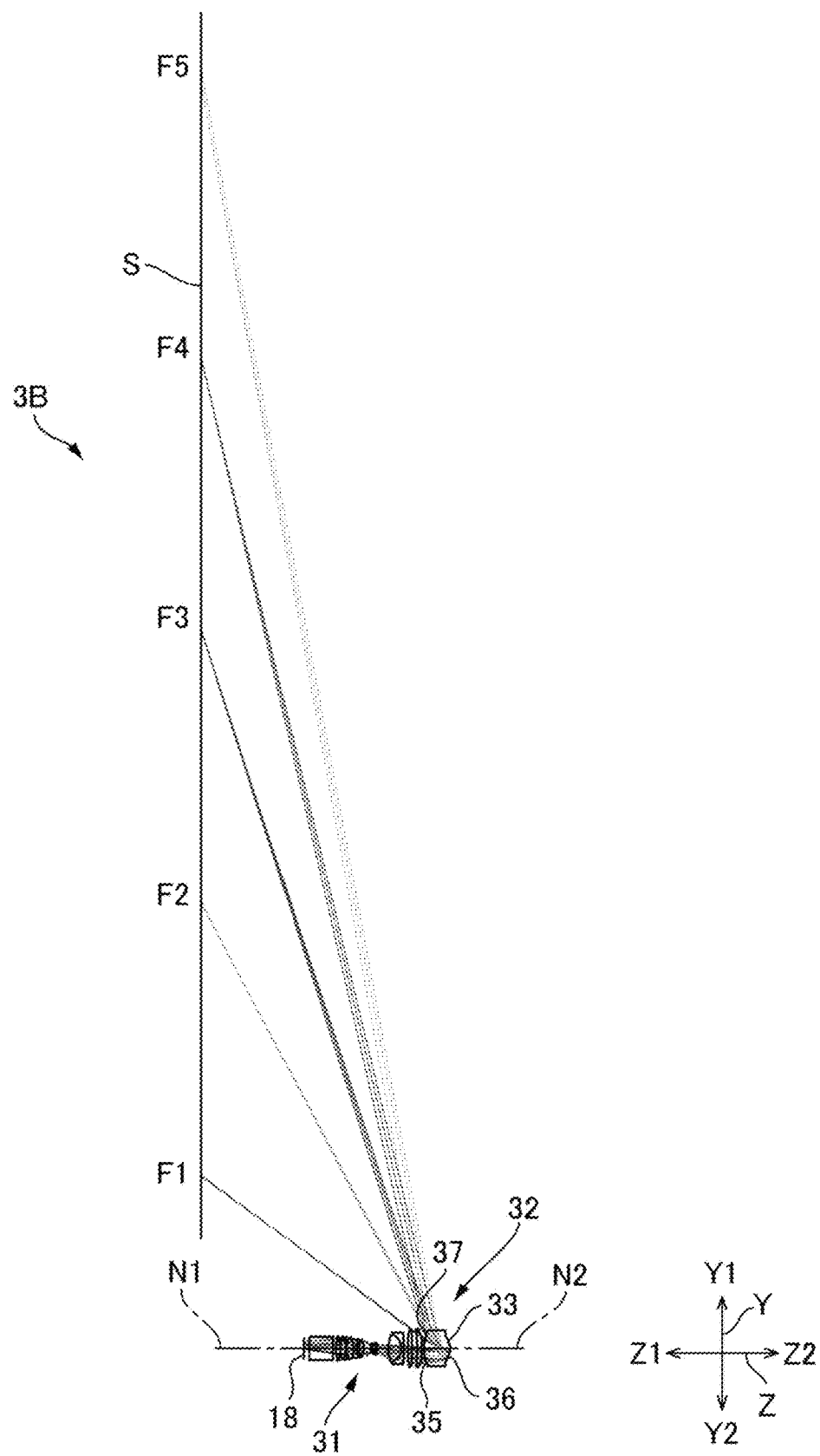
FIG. 8 is a light ray diagram diagrammatically showing the entire projection system according to Example 2.
Figure 9:
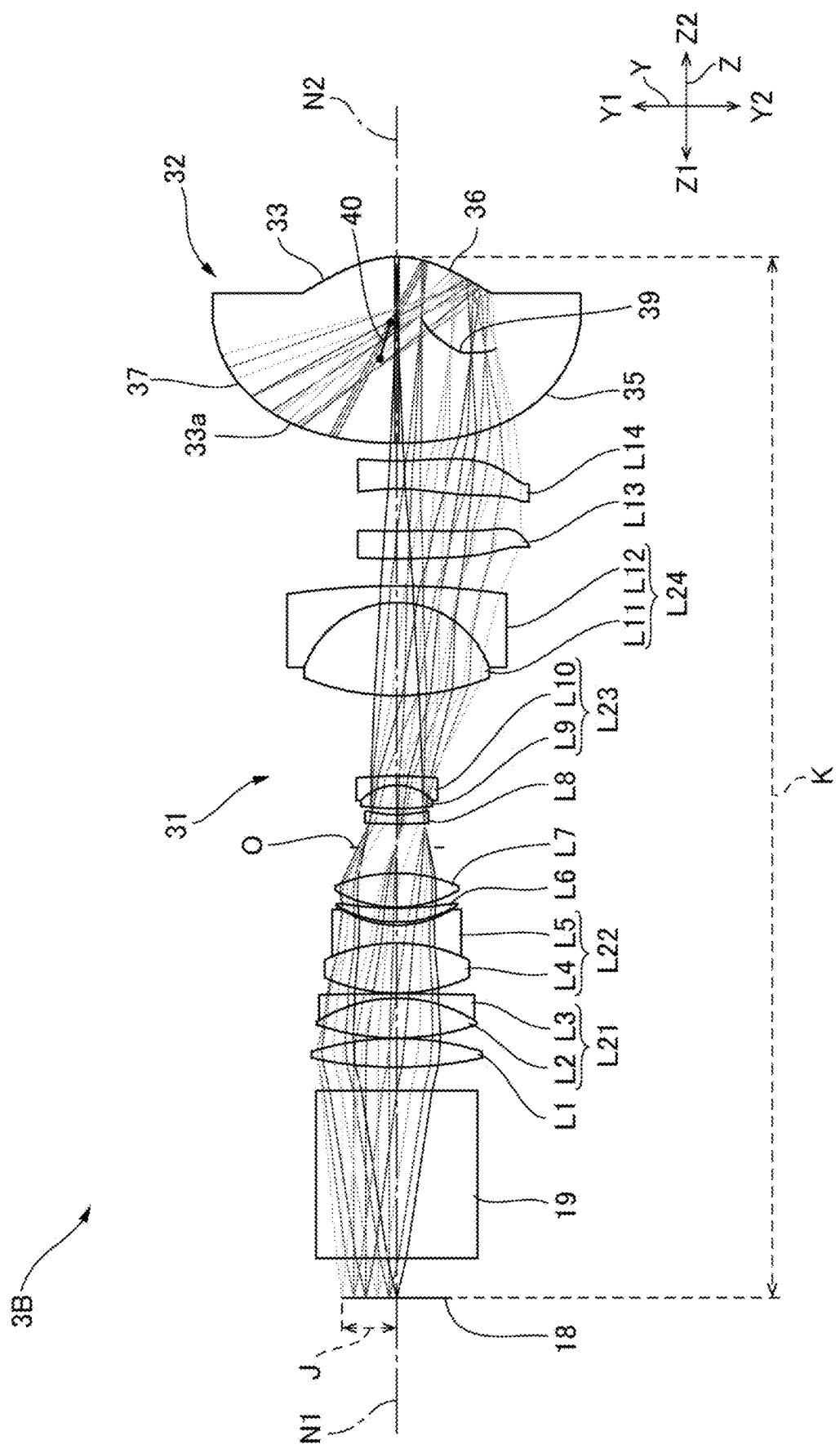
FIG. 9 is a light ray diagram of the projection system according to Example 2.
Figure 10:
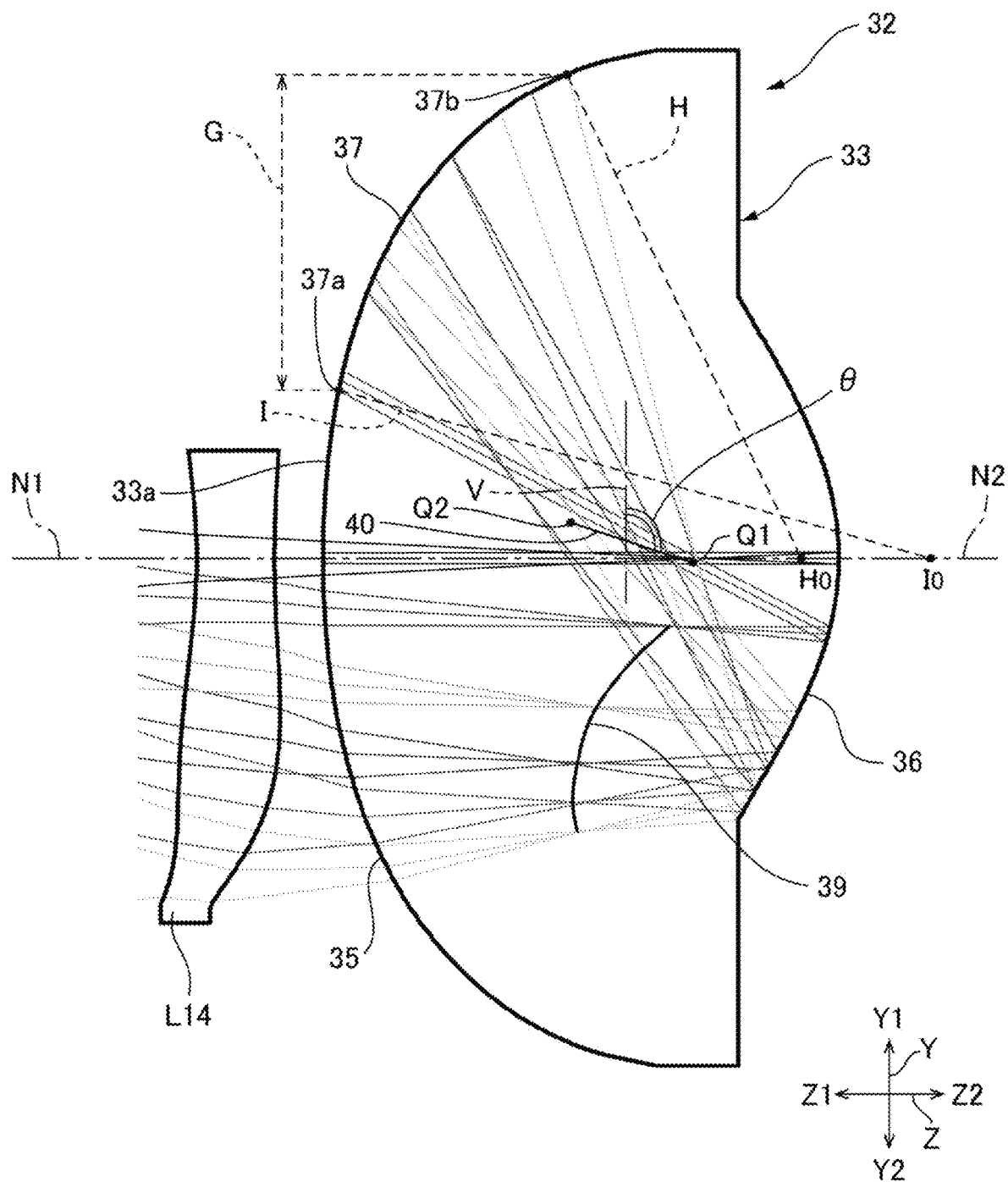
FIG. 10 is a light ray diagram of the second optical system of the projection system according to Example 2.

FIG. 8 is a light ray diagram diagrammatically showing the entirety of a projection system 3B according to Example 2. FIG. 9 is a light ray diagram of the projection system 3B according to Example 2. FIG. 10 is a light ray diagram of a second optical system of the projection system 3B according to Example 2. FIG. 8 diagrammatically shows the light fluxes F1 to F5, which exit out of the projection system 3B according to the present example and reach the screen S.

The projection system 3B according to the present example is formed of the first optical system 31 and the second optical system 32 sequentially arranged from the reduction side toward the enlargement side, as shown in FIG. 9. The first optical system 31 is a refractive optical system including a plurality of lenses. The second optical system 32 is formed of the one optical element 33. The optical element 33 has the first transmissive surface 35, the reflection surface 36, and the second transmissive surface 37 sequentially arranged from the reduction side toward the enlargement side. The first transmissive surface 35 has a convex shape protruding toward the reduction side. The reflection surface 36 has a concave shape. The second transmissive surface 37 has a convex shape protruding toward the enlargement side. The optical element 33, which forms the second optical system 32, is disposed in the first optical axis N1 of the first optical system 31. In the second optical system 32, the second optical axis N2 (optical axis) of the reflection surface 36 coincides with the first optical axis N1.

The liquid crystal panels 18 of the image formation section 2 are disposed in the reduction-side image formation plane of the projection system 3B. The liquid crystal panels 18 form the projection images at the upper side Y1 of the first optical axis N1 of the first optical system 31. The screen S is disposed in the enlargement-side image formation plane of the projection system 3B. The final image is projected on the screen S. The screen S is located at the upper side Y1 of the first optical axis N1. The intermediate image 39 conjugate with the reduction-side image formation plane and the enlargement-side image formation plane is formed between the first optical system 31 and the reflection surface 36 of the optical element 33. The intermediate image 39 is an image conjugate with the final image but turned upside down. The intermediate image 39 is formed inside the optical element 33 between the first transmissive surface 35 and the reflection surface 36. The intermediate image 39 is located at the lower side Y2 of the first optical axis N1.

The first optical system 31 includes the cross dichroic prism 19 and the 14 lenses L1 to L14, as shown in FIG. 9. The lenses L2 and L3 are bonded to each other into the first doublet L21. The lenses L4 and L5 are bonded to each other into the second doublet L22. The lenses L9 and L10 are bonded to each other into the third doublet L23. The lenses L11 and L12 are bonded to each other into the fourth doublet L24. The aperture O is disposed between the lens 7 and the lens L8. In the first optical system 31, the lens L13 has positive power. The first optical system 31 as a whole has positive power. Between the first optical system 31 and the second optical system 32, the gap between the chief rays therein therefore decreases with distance to the second optical system 32.

The optical element 33 is designed by using the second optical axis N2 of the reflection surface 36 as the axis in the design stage. The first transmissive surface 35 and the reflection surface 36 are located at the lower side Y2 of the second optical axis N2, and the second transmissive surface 37 is located at the upper side Y1 of the second optical axis N2, as shown in FIGS. 9 and 10. That is, the optical element 33 has the first surface 33a facing the first optical system 31. The first transmissive surface 35 is a portion of the first surface 33a that is the portion provided at the lower side Y2 of the second optical axis N2, and the second transmissive surface 37 is a portion of the first surface 33a that is the portion provided at the upper side Y1 of the second optical axis N2. The first transmissive surface 35 and the second transmissive surface 37 are contiguous to each other. The first transmissive surface 35 and the second transmissive surface 37 are rotationally symmetric when rotated by 180° around the second optical axis N2. The first transmissive surface 35, the reflection surface 36, and the second trans missive surface 37 each have a rotationally symmetric shape around the second optical axis N2. The first transmissive surface 35, the reflection surface 36, and the second transmissive surface 37 are each provided within the angular range of 180° around the second optical axis N2.

Lens Data

The numerical aperture of the projection system 3B is 0.257. Data on the lenses of the projection system 3B are listed below. The projection distance of the projection system 3B is the distance from the surface having the surface number 30 to the screen S.

| Surface number | Name | r | d | nd | vd | Mode | Y |
|---|---|---|---|---|---|---|---|
| Object plane | | 18 | 0 | 8.5 | | Refraction | |
| 1 | | 19 | 0 | 35.95 | 1.51633 | 64.14 | Refraction | 12.861 |
| 2 | | | 0 | 5 | | | Refraction | 16.08 |
| 3 | L01 | 84.24049 | 6.182427 | 1.78433 | 47.23 | Refraction | 17 |
| 4 | | −60.46428 | 0.1 | | | Refraction | 17.036 |
| 5 | L02 | 52.68233 | 8.542616 | 1.687086 | 51.88 | Refraction | 15.98 |
| 6 | L03 | −31.50464 | 1 | 2.0508 | 26.942 | Refraction | 15.473 |
| 7 | | −539.06938 | 0.1 | | | Refraction | 15.041 |
| 8 | L04 | 37.63411 | 10.764813 | 1.618081 | 56.93 | Refraction | 14.355 |
| 9 | L05 | −34.60962 | 3.83691 | 2.0508 | 26.942 | Refraction | 12.765 |
| 10 | | 22.29565 | 0.668661 | | | Refraction | 11.563 |
| 11 | L06 | 25.43621 | 3.010487 | 1.930449 | 17.16 | Refraction | 11.701 |
| 12 | | 73.69967 | 0.2 | | | Reflection | 11.643 |
| 13 | L07 | 25.84789 | 7.294718 | 1.547555 | 65.04 | Reflection | 11.742 |
| 14 | | −33.05775 | 5.5 | | | Reflection | 11.381 |
| Aperture plane | | 0 | 5.1 | | | Reflection | 7.8 |
| 16 | L08 | 146.36652 | 2 | 2.0508 | 26.942 | Reflection | 8.234 |
| 17 | | 28.57796 | 1.306849 | | | Reflection | 8.265 |
| 18 | L09 | 58.63527 | 4.994942 | 1.830024 | 18.81 | Reflection | 8.541 |
| 19 | L10 | −10.53022 | 2 | 2.0508 | 26.942 | Reflection | 8.54 |
| 20 | | −84.82778 | 17.2598 | | | Reflection | 9.92 |
| 21 | L11 | 53.50377 | 20 | 1.73334 | 21.32 | Refraction | 18 |
| 22 | L12 | −21.07109 | 3.569619 | 1.991895 | 17.11 | Refraction | 18.53 |
| 23 | | −158.04724 | 5.807116 | | | Refraction | 22.087 |
| *24 | L13 | 148.47075 | 6 | 1.531131 | 55.75 | Refraction | 26.209 |
| *25 | | 650.63668 | 9.065182 | | | Refraction | 26.882 |
| *26 | L14 | −40.83487 | 6 | 1.531131 | 55.75 | Refraction | 26.371 |
| *27 | | 75.54135 | 3.815481 | | | Refraction | 26.77 |
| *28 | 35 | 75 | 40 | 1.509398 | 56.47 | Refraction | 25.072 |
| *29 | 36 | −20.55626 | −40 | 1.509398 | 56.47 | Reflection | 20.368 |
| *30 | 37 | 75 | −340 | | | Refraction | 37.671 |
| Image plane | S | 0 | 0 | | | Refraction | 1920.039 |

The first transmissive surface 35, the reflection surface 36, and the second transmissive surface 37 of the optical element 33 are each an aspheric surface. The reflection surface 36 is a reflection coating layer provided on a surface of the optical element 33 that is the surface opposite the first transmissive surface 35. The first transmissive surface 35, the reflection surface 36, and the second transmissive surface 37 are instead each a free-form surface in some cases.

The pupil 40 of the second optical system 32 is located inside the optical element 33, as shown in FIG. 10. The pupil 40 of the second optical system 32 in the plane YZ is defined by the line that connects the upper intersection Q1, where the upper peripheral light ray of the upper end light flux passing through the axis-Y-direction upper end of the effective light ray range G of the second transmissive surface 37 and the upper peripheral light ray of the lower end light flux passing through the axis-Y-direction lower end of the effective light ray range G intersect each other in the plane YZ, to the lower intersection Q2, where the lower peripheral light ray of the upper end light flux and the lower peripheral light ray of the lower end light flux intersect each other in the plane YZ. The pupil 40 inclines with respect to the imaginary vertical line V perpendicular to the second optical axis N2 in the plane YZ. In the present example, the inclination angle θ by which the pupil 40 inclines with respect to the imaginary vertical line V is greater than or equal to 90°.

The aspheric coefficients of each of the aspheric surfaces are listed below.

| Surface number | 24 |
|---|---|
| Conic constant | 5.515539E+00 |
| Fourth-order coefficient | −1.299777E−05 |
| Sixth-order coefficient | 4.968559E−08 |
| Eighth-order coefficient | −4.431729E−11 |

| Surface number | 25 |
|---|---|
| Conic constant | 1E+02 |
| Fourth-order coefficient | −1.40102E−05 |
| Sixth-order coefficient | 5.906768E−08 |
| Eighth-order coefficient | −6.10124E−11 |

| Surface number | 26 |
|---|---|
| Conic constant | −1.760956E+01 |
| Fourth-order coefficient | 1.78046E−05 |
| Sixth-order coefficient | −2.075195E−08 |
| Eighth-order coefficient | 1.118352E−12 |

| Surface number | 27 |
|---|---|
| Conic constant | 6.356227E+00 |
| Fourth-order coefficient | −2.776687E−05 |

-continued

| | |
|---|---|
| Sixth-order coefficient | 1.076245E−08 |
| Eighth-order coefficient | −7.204845E−12 |

| Surface number | 28 |
|---|---|
| Conic constant | 2.661693E+00 |
| Fourth-order coefficient | 1.778649E−06 |
| Sixth-order coefficient | 7.496096E−10 |
| Eighth-order coefficient | −1.182048E−12 |
| Tenth-order coefficient | 5.865021E−16 |

| Surface number | 29 |
|---|---|
| Conic constant | −2.055626E+01 |
| Fourth-order coefficient | −4.071838E+00 |
| Sixth-order coefficient | −2.121738E−05 |
| Eighth-order coefficient | 6.316358E−08 |
| Tenth-order coefficient | −1.009726E−10 |
| Twelfth-order coefficient | 8.489819E−14 |

| Surface number | 30 |
|---|---|
| Conic constant | 7.5E+01 |
| Fourth-order coefficient | 2.661693E+00 |
| Sixth-order coefficient | 1.778649E−06 |
| Eighth-order coefficient | 7.496096E−10 |
| Tenth-order coefficient | −1.182048E−12 |
| Twelfth-order coefficient | 5.865021E−16 |

The surface having the surface number 30, that is, the second transmissive surface 37 has curvature in the second direction Z2 that increases as the distance from the second optical axis N2 toward the upper side Y1 increases. In more detail, the first radius of curvature H at the first end 37a of the effective light ray range G of the second transmissive surface 37 in the plane YZ, which is the end closest to the second optical axis N2 in the axis-Y direction, is greater than the second radius of curvature I at the second end 37b of the effective light ray range G of the second transmissive surface 37 in the plane YZ, which is the end farthest from the second optical axis N2 in the axis-Y direction, as shown in FIG. 10. The first center of curvature HO of the first end 37a and the second center of curvature IO of the second end 37b are located on the second optical axis N2, and the first center of curvature HO is farther than the second center of curvature IO from the first end 37a. That is, the first center of curvature HO of the first end 37a is shifted in the second direction Z2 from the second center of curvature IO of the second end 37b.

Figure 11:
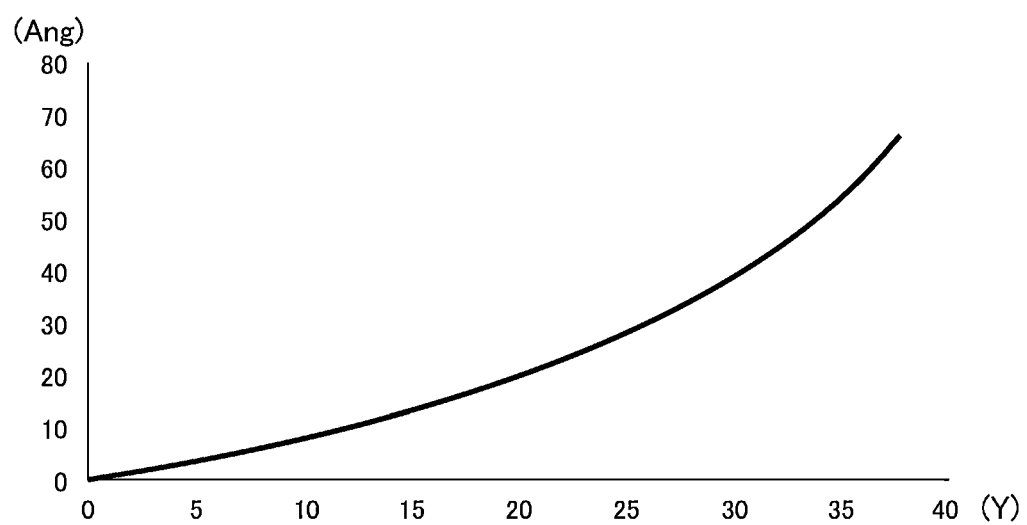
FIG. 11 is a graph showing the relationship between the height position on the second transmissive surface and the inclination angle of the tangent at the height position.

In other words, the second transmissive surface 37 is so shaped that the inclination of the tangent at each height position separate from the second optical axis N2 toward the upper side Y1 increases with distance from the second optical axis N2. The second transmissive surface 37 is further so shaped that the rate of the increase in the inclination of the tangent at each height position from the second optical axis N2 increases with distance from the second optical axis N2 toward the upper side Y1. The following data shows the relationship between the height position Y in the effective light ray range (effective light ray diameter) and the inclination angle Ang of the tangent at the height position Y. FIG. 11 is a graph showing the relationship between the height position Y in the light ray effective diameter and the inclination angle Ang of the tangent at the height position Y. In FIG. 11, the horizontal axis represents the height position Y, and the vertical axis represents the angle Ang. The height position Y along the second optical axis N2 is zero. The height position Y is expressed in millimeters.

In the projection system 3B, the quotient of the operation of dividing the axial inter-surface distance K from the liquid crystal panels 18, which are located in the reduction-side image formation plane, to the reflection surface 36 by the radius J of the image circle in the reduction-side image formation plane is smaller than 20, as shown in FIG. 9. That is, the axial inter-surface distance K is 223.57 mm, and the radius J is 11.7 mm. The quotient of the operation of dividing the axial inter-surface distance K by the radius J is 19.1, which is smaller than 20.

Effects and Advantages

The projection system 3B according to the present example provides the same effects and advantages as those provided by the projection system 3A described above.

Figure 12:
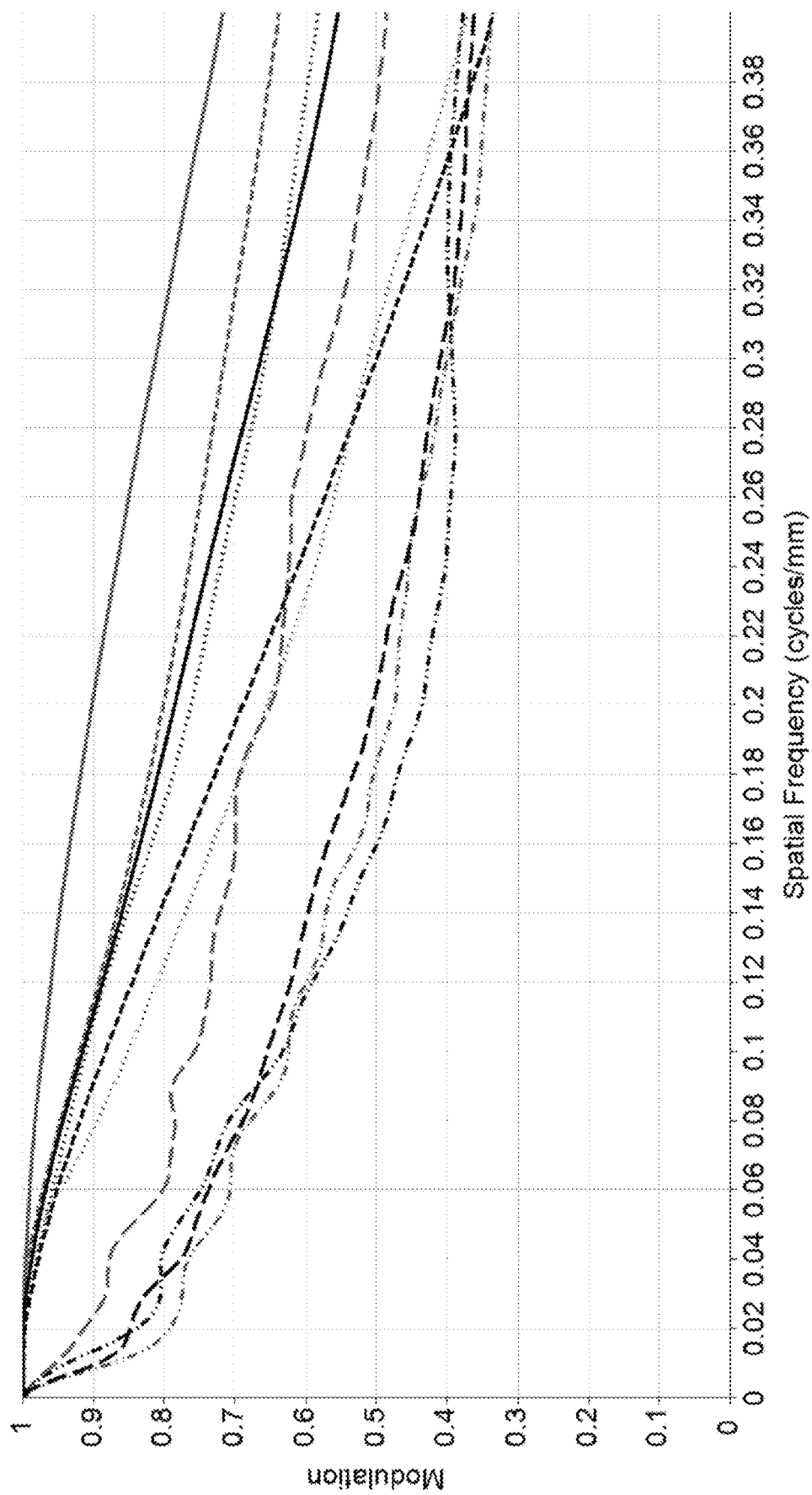
FIG. 12 shows the enlargement-side MTF of the projection system according to Example 2.
Figure 13:
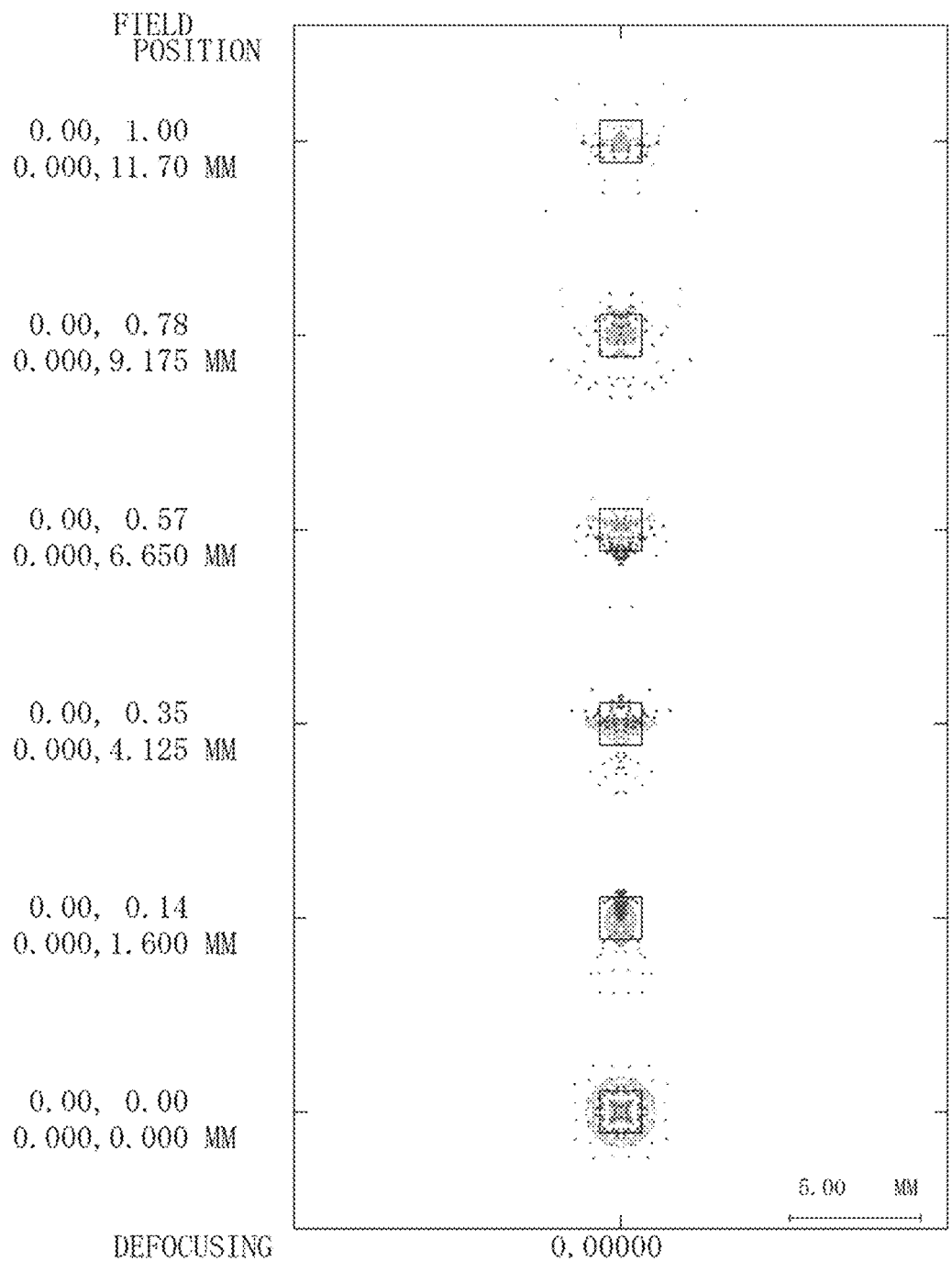
FIG. 13 is a spot diagram showing how the light is collected on an image height position basis.

FIG. 12 shows the enlargement-side MTF of the projection system 3B. FIG. 13 is a spot diagram showing how the light is collected on an image height position basis.

The projection systems 3A and 3B can each include a third optical system including an optical member, such as a lens and a mirror, on the enlargement side of the second optical system 32.

What is claimed is:

1. A projection system comprising:
a first optical system; and
a second optical system including an optical element and disposed at an enlargement side of the first optical system,
wherein the optical element has a first transmissive surface, a reflection surface disposed at the enlargement side of the first transmissive surface, and a second transmissive surface disposed at the enlargement side of the reflection surface,
the second transmissive surface has a convex shape protruding toward the enlargement side and has an aspheric shape,
an effective light ray range of the second transmissive surface has a first end close to an optical axis of the reflection surface in a first axis direction along a first axis perpendicular to the optical axis and a second end far from the optical axis in the first axis direction,
a first radius of curvature at the first end is greater than a second radius of curvature at the second end, and
a first center of curvature of the first end is farther than a second center of curvature of the second end from the first end.

2. The projection system according to claim 1, wherein the first transmissive surface has an aspheric shape.

3. The projection system according to claim 1, wherein the optical element has a first surface facing the first optical system,
the first transmissive surface is a portion of the first surface that is a portion provided at one side of the optical axis, and
the second transmissive surface is a portion of the first surface that is a portion provided at other side of the optical axis.

4. The projection system according to claim 3, wherein the first transmissive surface and the second transmissive surface are rotationally symmetric when rotated by 180° around the optical axis.

5. The projection system according to claim 1, wherein the first transmissive surface, the reflection surface, and the second transmissive surface each have a rotationally symmetric shape around the optical axis.

6. The projection system according to claim 1,
wherein the optical axis coincides with an optical axis of the first optical system.

7. The projection system according to claim 1,
wherein a quotient of operation of dividing an axial inter-surface distance by a radius of an image circle in the reduction-side image formation plane is smaller than 20, and
the axial inter-surface distance is a distance from a reduction-side image formation plane to the reflection surface.

8. The projection system according to claim 1,
wherein a numerical aperture is greater than 0.25.

9. The projection system according to claim 1,
wherein between the first optical system and the second optical system, a gap between chief rays therein decreases with distance to the second optical system.

10. The projection system according to claim 1,
wherein the first transmissive surface has a convex shape protruding toward a reduction side.

11. The projection system according to claim 1,
a pupil that connects an upper intersection to a lower intersection inclines with respect to an imaginary vertical line extending in the first axis direction in a plane containing the optical axis and the first axis,
the upper intersection is an intersection where an upper peripheral light ray of an upper end light flux passing through an upper end of the effective light ray range of the second transmissive surface that is an upper end in the first axis direction and an upper peripheral light ray of a lower end light flux passing through a lower end of the effective light ray range that is a lower end in the first axis direction intersect each other in the plane, and
the lower intersection is an intersection where a lower peripheral light ray of the upper end light flux and a lower peripheral light ray of the lower end light flux intersect each other in the plane.

12. The projection system according to claim 1,
wherein an intermediate image is formed at the reduction side of the reflection surface.

13. A projector comprising:
the projection system according to claim 1; and
an image formation section that forms a projection image in a reduction-side image formation plane of the projection system.

* * * * *